United States Patent [19]

Hudson, Jr.

[11] 4,317,662
[45] Mar. 2, 1982

[54] OIL SEPARATOR DEVICE

[75] Inventor: Sharon J. Hudson, Jr., Toledo, Ohio

[73] Assignee: Sharon Manufacturing Company, Toledo, Ohio

[21] Appl. No.: 197,900

[22] Filed: Oct. 17, 1980

Related U.S. Application Data

[63] Continuation-in-part of Ser. No. 19,886, Mar. 12, 1979, Pat. No. 4,234,328.

[51] Int. Cl.³ .............................................. B01D 45/12
[52] U.S. Cl. ...................................... 55/392; 55/436; 55/447; 55/459 B
[58] Field of Search ................ 55/319, 184, 199, 201, 55/392, 397, 436, 441, 447, 456, 457, 459 B, 459 C

[56] References Cited

U.S. PATENT DOCUMENTS

| 1,240,368 | 9/1917 | Reese | 55/392 |
| 1,525,136 | 2/1925 | Kopke | 55/447 |
| 2,170,704 | 8/1939 | Bourne | 55/392 |
| 3,263,404 | 8/1966 | Krizman, Jr. | 55/447 |
| 3,724,180 | 4/1973 | Morton et al. | 55/456 |
| 3,976,452 | 8/1976 | Meier et al. | 55/199 |

FOREIGN PATENT DOCUMENTS 52987 10/1945 France ............................. 55/447

Primary Examiner—David L. Lacey

[57] ABSTRACT

An oil separator device for use in a crankcase ventilation system of an internal combustion engine. The device comprises a cannister having an internal baffle member and partition means defining therewith an oil laden fume inlet chamber, an oil separating chamber and a fume outlet chamber. Oil laden fumes enter the fume inlet chamber where they are directed by the baffle member to a first 180° volute section of the oil separating chamber and then to a second 180° volute section having a smaller radius of curvature than the first section to thereby produce a vortex region adjacent to the center of the second volute section. Gaseous fluid with oil removed flows upwardly out of the oil separating chamber into the fume outlet chamber through a flue aperture in the partition at a location above the vortex region while separated oil is returned to the engine lubrication system through a drain aperture in the bottom of the cannister.

14 Claims, 12 Drawing Figures

OIL SEPARATOR DEVICE

CROSS REFERENCE TO RELATED APPLICATIONS

The present application is a continuation-in-part of U.S. patent application Ser. No. 019,886 filed Mar. 12, 1979 now U.S. Pat. No. 4,234,328 issued Nov. 18, 1980.

BACKGROUND OF THE INVENTION

1. Field of the Invention

Generally speaking this invention relates to a separator device for removing the liquid from a liquid laden gaseous stream. More specifically it relates to a device for separating oil mist from oil laden internal combustion engine crankcase fumes.

2. Background Information

Under present day regulations the crankcase fumes of internal combustion engines must not be vented to the atmosphere. They are generally circulated in a loop from the crankcase back into the engine along with fresh combustion air. A problem is presented when the crankcase fumes are laden with a quantity of oil vapors and mist sufficient to alter the combustion of a fuel-air charge delivered to a cylinder. To alleviate the problem a means must be provided for removing a major portion of the oil mist and vapor from the crankcase fumes prior to their being circulated into the combustion air intake.

Accordingly it is a principal object of this invention to provide a simple apparatus which will effectively remove a substantial portion of the oil from an oil laden stream of crankcase fumes so that the gaseous portion of the fumes may be united with fresh combustion air and cycled through the combustion system.

It is a further object of this invention to return the separated oil portion of the oil laden crankcase fumes back to the lubrication system.

3. Summary of the Invention

The oil separator of this invention comprises a cannister with interior members which divide the cannister into an oil laden fume inlet chamber, an oil separating chamber and a fume outlet chamber. A baffle member directs oil laden fumes between itself and an outside wall of the cannister to a first curved end section of the oil separating chamber which redirects the fumes 180° to the opposite end of the separating chamber. The opposite end is also curved but its radius of curvature is smaller than that of said first curved end. The oil laden fumes are caused to swirl around in the chamber creating a vortex region adjacent to the center of said opposite end. The lighter or gaseous portion of the fumes flows up through a flue aperture in the top of the separating chamber into the outlet chamber where it exits the cannister through an outlet while the heavier oil portion of the mixture gravitates to the bottom of the cannister where it is returned to the engine lubrication system through a drain aperture.

DETAILED DESCRIPTION OF THE DRAWINGS

Figure 1:
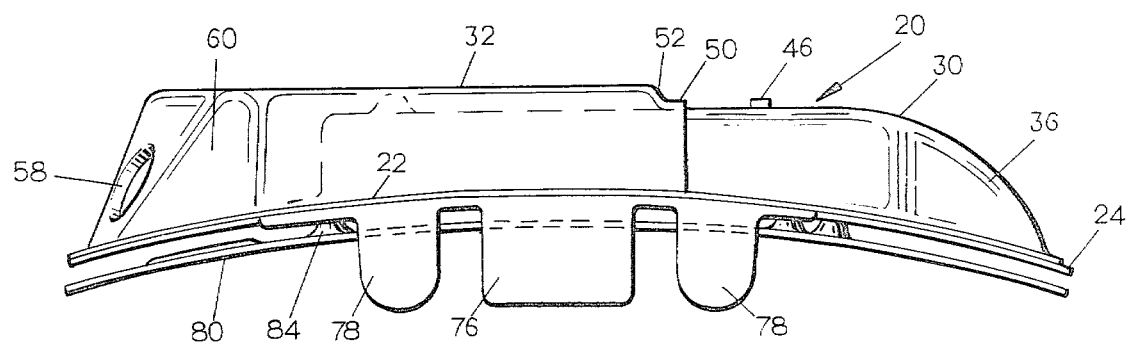
FIG. 1 is an elevational view of an embodiment of an oil separator of this invention taken from a side adjacent to an end of a rocker arm cover of an internal combustion engine.

The invention will be understood best if the following description is read while refering to the drawings wherein the presently preferred oil separator embodiment 20 is illustrated in FIGS. 1-8. The oil separator 20 comprises a sheet metal cannister made of an inverted pan assembly 21 having an arcuate bottom edge 22 conforming in curvature to an arcuate bottom plate 24. The pan assembly is attached to the bottom plate 24 by means of spot welding 26 at spaced locations around a laterally extending peripheral flange 28. The pan assembly 21 comprises partially overlapping first pan member 30, a partially overlapped second pan member 32 and a U-shaped baffle member 34 disposed inside the first pan member 30. The first pan member has a generally oblong circular shape with a protruding nose section 36 at one end. A circular outlet or flue aperture 38 with a diameter of approximately $\frac{3}{4}''$ is located in the top panel of the first pan member off center towards one side of the circular end 40 of the pan member 30 opposite from the nosed end 36. The U-shaped baffle member 34 has one leg 41 in contact with the pan member 30 sidewall and the other leg 42 parallel with and spaced approximately $\frac{1}{2}''$ from the opposite sidewall thus forming a relatively short oblong oil separating chamber 44 substantially centered on the outlet aperture 38. Preferably the height of the baffle member is equivalent to the inside height of the chamber 44 and it is held in position within the pan member 30 by means of a pair of integral tabs 46 which extend through corresponding slots in the pan member. The tabs may have sufficient height to protrude above the outside of the pan member 30 and thus serve to indicate after assembly of the unit is completed that the baffle member is properly positioned (see FIG. 1). An upper edge portion of the baffle leg 41 adjacent to the top of the sidewall of the first pan member may be cut away so as not to come into interference with the radiused corner edge between the top panel and sidewall portions of this pan member.

The second pan member 32 overlaps the apertured circular end 40 of the first pan member and is also held in position by a pair of tabs 48 which extend through corresponding slots in the first pan member. The edge of the overlapping end of the pan member 32 has a flange 50 which fits tightly against the top panel of the first pan member 30 and has a riser or step 52 so as to space the top panel of the second pan member approximately ⅛" above the top panel of the first pan member. An upwardly extending protuberance 54 stamped in top panel of the first pan member near or on its centerline also spaces the corresponding panel portions of the two panels from each other to form a shallow passageway (see FIGS. 3 and 7) from and around the aforementioned flue aperture 38 into the deeper portion of the fume outlet chamber 56. The fume outlet chamber is defined by the overlapped outside surface portion of the first pan member, the inside surface of the second pan member and a corresponding inside surface portion of the bottom plate 24. The fume outlet aperture 58 is located in the angular end wall of the nose section 60 of the second pan member. The peripheral flange 28 of the pan assembly is comprised of flange sections on both pan members. In the flange areas where the sidewall sections of the overlapping second pan member are in contact with the sidewall sections of the overlapped portion of the first pan member the flange portions of the first pan member are trimmed away (see FIG. 7).

Figure 2:
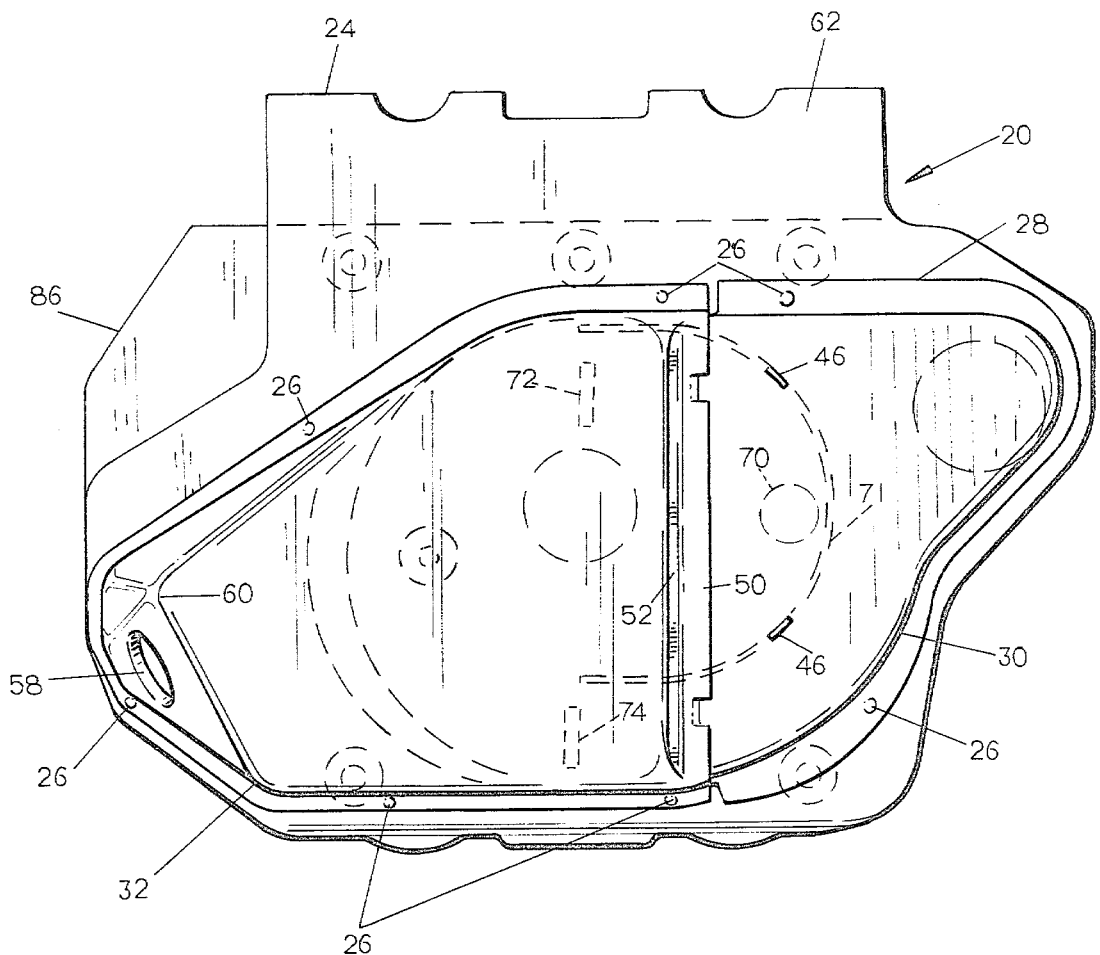
FIG. 2 is a top view of the oil separator of FIG. 1 with certain underlying portions shown in dashed lines.
Figure 8:
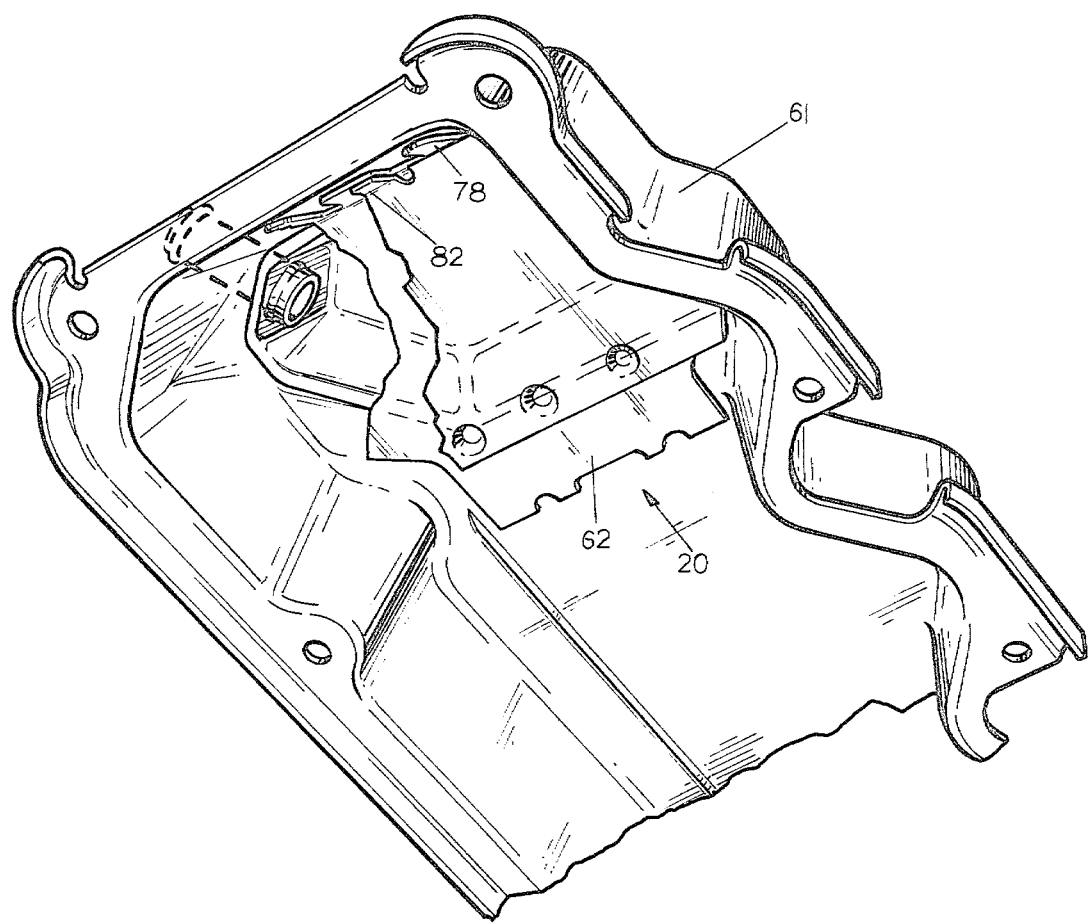
FIG. 8 is a perspective view of the inside of one end of a rocker arm cover with the oil separator in place therein.
Figure 3:
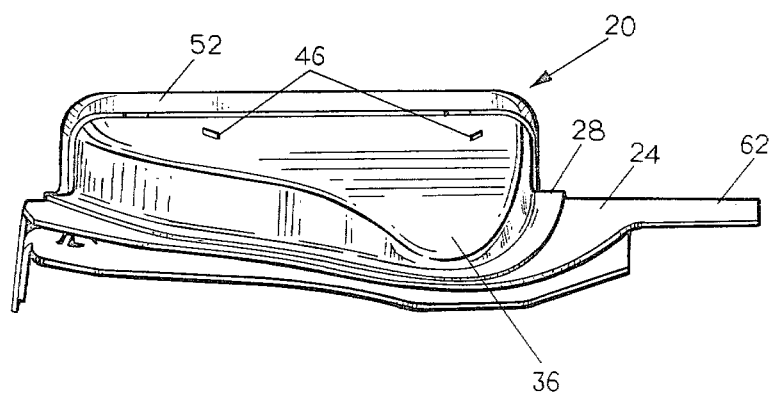
FIG. 3 is an elevational view of right end of the oil separator of FIG. 1.
Figure 5:
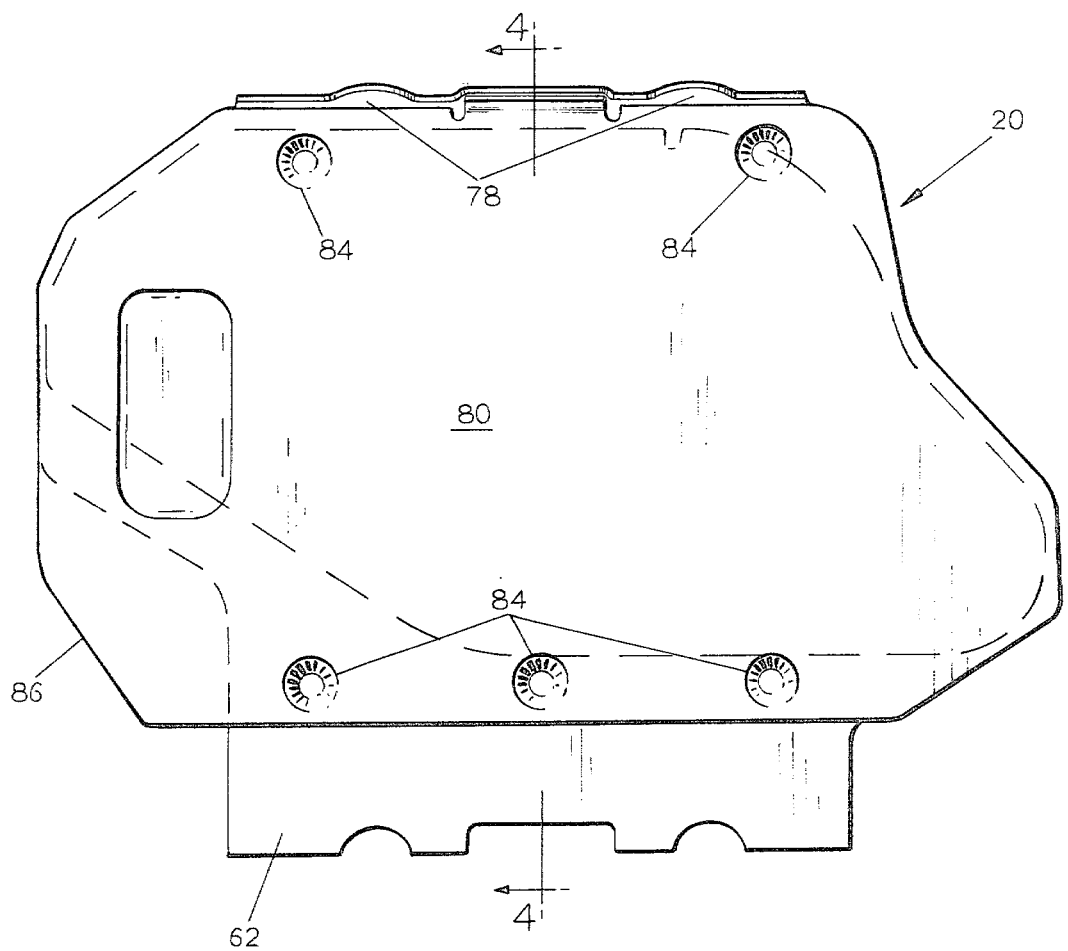
FIG. 5 is a bottom view of the oil separator of FIG. 1.
Figure 4:
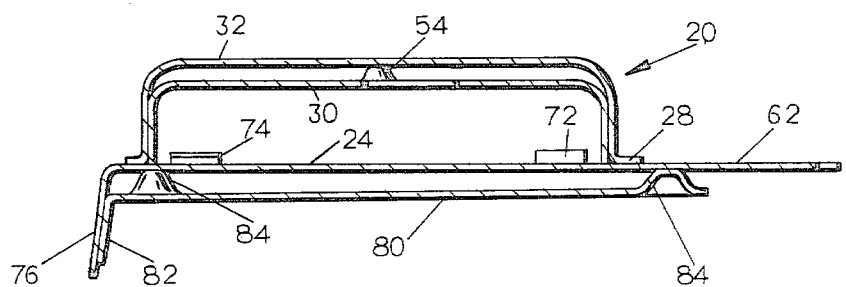
FIG. 4 is an upright sectional view taken along line 4—4 of FIG. 5.
Figure 6:
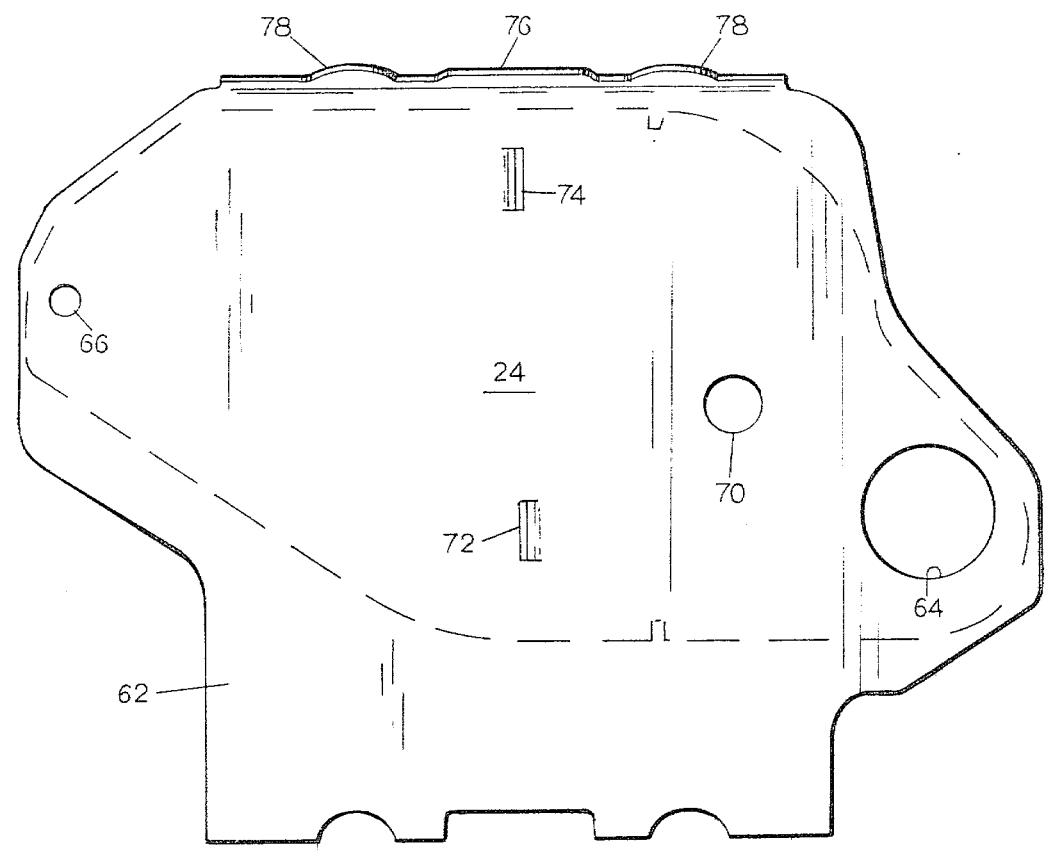
FIG. 6 is a bottom view similar to FIG. 5 but with the barrier plate removed to show the details of the separator bottom plate.
Figure 7:
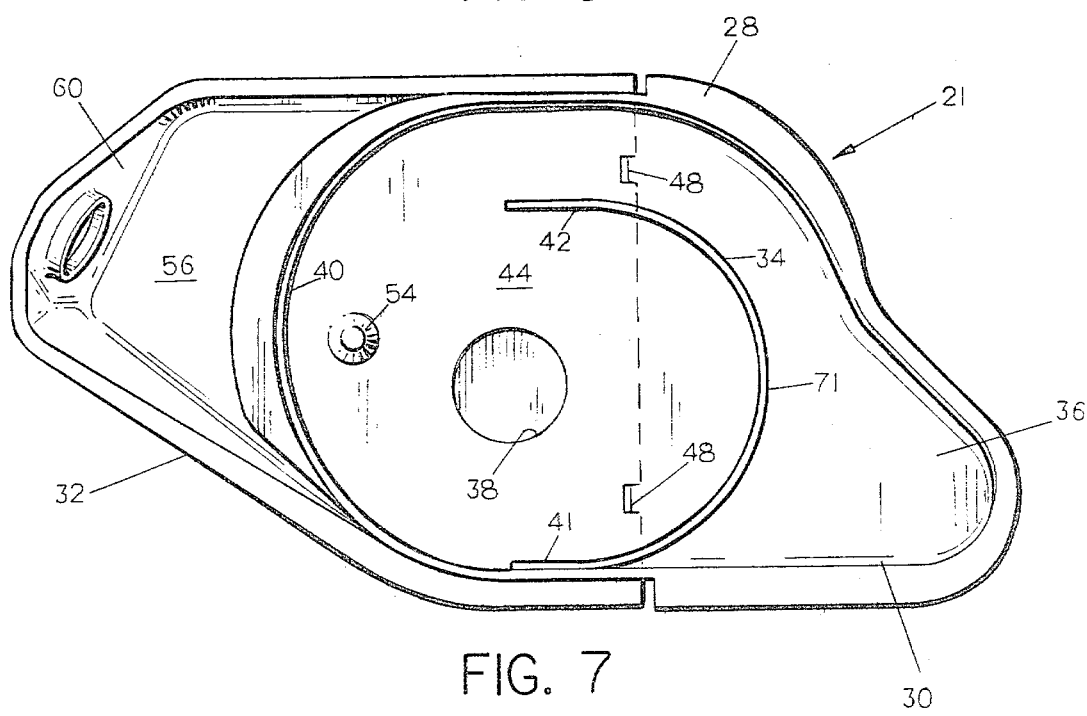
FIG. 7 is a bottom view similar to FIG. 6 but with the bottom plate removed to show interior details.
Figure 11:
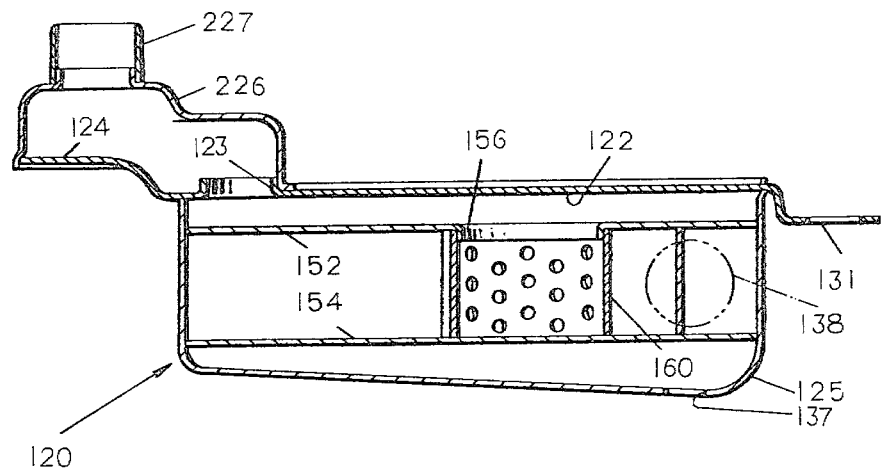
FIG. 11 is a sectional view taken along lines 11-11 of FIG. 10.
Figure 9:
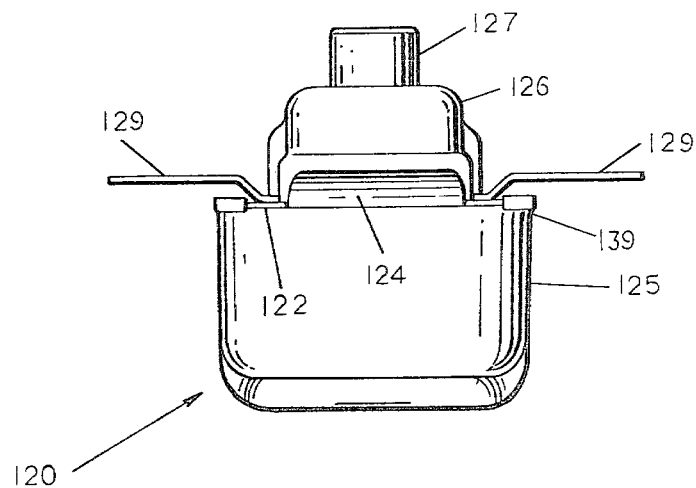
FIG. 9 is an elevational view of the left end of another oil separator embodiment.
Figure 10:
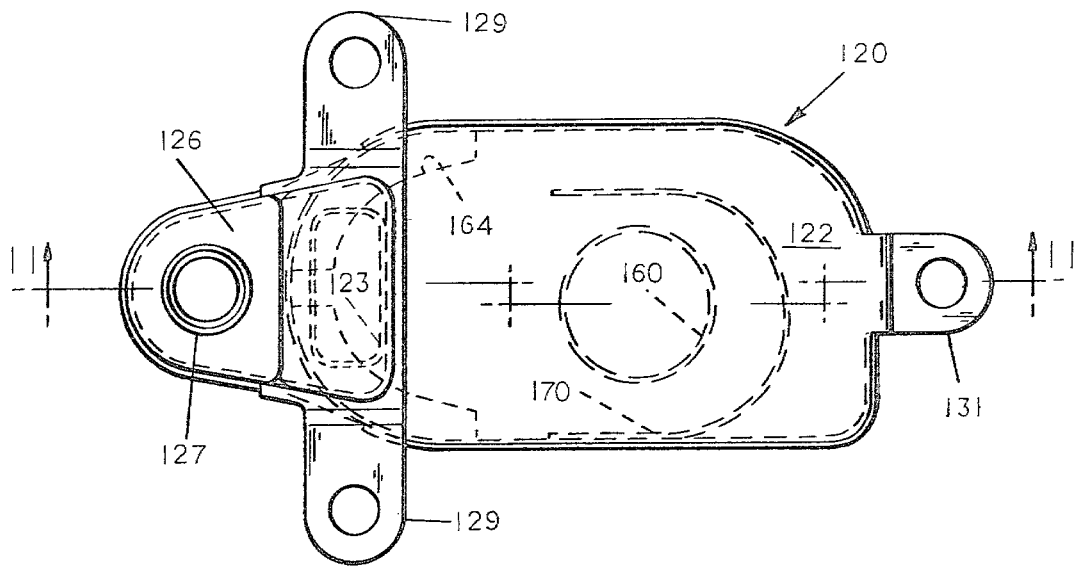
FIG. 10 is a top view of the FIG. 9 embodiment with certain of the interior details shown in dashed lines.
Figure 12:
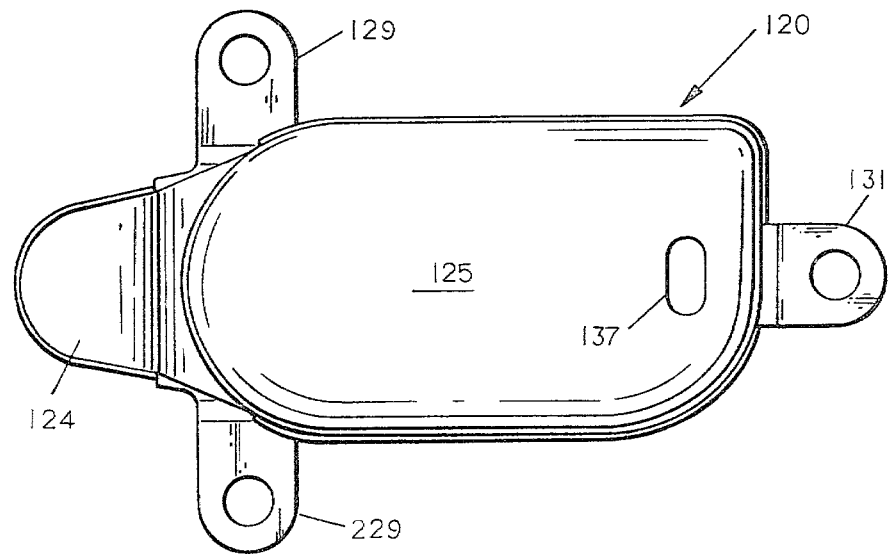
FIG. 12 is a bottom view of the FIG. 9 embodiment.

The outline of the bottom plate member 24 generally conforms in shape to the portion of the outline of the pan assembly along its ends and side which lies in close proximity to the rocker arm cover 61 walls. The plate portion adjacent the remaining side of the pan assembly has a generally rectangular plate extension 62 as can be seen clearly in FIGS. 6 and 8. The bottom plate has a circular inlet opening 64 of approximately ⅞" diameter directly below the end of the nose 36 of the first pan member and a small diameter, ie. about ⅛" diameter supplemental liquid drain aperture 66 directly below the end of nose 60 of the second pan member. A primary liquid drain aperture 70 of about 5/16" diameter is located in the bottom plate at a point on the inside of the U-shaped baffle adjacent to the center of its closed arcuate end 71 as can be seen in FIGS. 2 and 6. The lanced slots 72 and 74 are provided in the bottom plate member to serve as liquid scuppers. These slots lie along and on opposite sides of a line in a vertical plane passing through the center of the separating chamber flue aperture 38. Both of them are formed so that their lanced edges extend angularly into the oil separating chamber and face upstream in their respective portions of the separating chamber. One lanced slot 74 is located on the outside of the baffle member 34 adjacent to the free end of the leg 41 of baffle member 34 which leg forms the inside wall of the incoming passageway to the separating chamber 44. The other lanced slot 72 is adjacent to the free end of the opposite leg 42 of the baffle member on the inside thereof. The edge of the baffle member along the side opposite from the generally rectangular extension has a downwardly extending rectangular tab 76 spaced from and located between a pair of similarly disposed tabs 78 having semi-circular ends. The pair of tabs are used to spot weld the oil separating devise 20 to the end wall of the rocker arm cover 61 while the rectangular tab is used to sub assemble the bottom plate to a barrier plate 80 by spot welding rectangular tab 76 to a corresponding tab 82 on the barrier plate.

The barrier plate shields the various apertures in the bottom plate from the direct ingress of the oil laden fumes and also reduces turbulence in the area between it and the bottom plate. It is spaced approximately ⅛" below the bottom plate by means of a plurality of protuberances 84 stamped in the barrier plate along two opposite sides. The two plates can be further secured together by spot welding the tips of the protuberances 84 to the bottom plate. The outline of the barrier plate 80 generally conforms to that of the bottom plate except in the region of the rectangular bottom plate extension 62 where it is of reduced width (see FIG. 5) and in a corner area 86 adjacent to nose section 60 where it extends beyond the bottom plate.

The embodiment 120 illustrated in FIGS. 9-12 is similar to the previously described embodiment 20 particularly with respect to the shape of the oil separating chamber. Oil separator 120 comprises a cannister having a top shell member 122 in the form of a generally flat cover plate with an extruded rectangular fume outlet aperture 123 adjacent to its front end on the left side of FIGS. 10 and 11. Forward of the outlet aperture 123 is an extension 124 which protrudes beyond the end of the bottom shell member 125. This extension 124 forms the bottom portion of a small outlet plenum. The top portion of the plenum is formed by a separate stepped dome member 126 sealed over the outlet aperture and around the stepped extension 124 of the top shell member 122. The dome member 126 has an outlet aperture with an extruded collar over which is mounted a short nipple connector 127. A pair of integral mounting bracket arms 129 extend in opposite directions from the sides of the dome member 126. A third mounting bracket arm 131 extends from the rear end of the top shell member 122. The bottom shell member 125 is a dished member with vertical sidewalls integrally connected through radiused corners to a planar bottom panel which is inclined downwardly from the front to the back end. At the bottom of the radiused corner of the rear wall is an outlet aperture comprising the oil drain outlet 137. The fume inlet 138 is located at an intermediate level adjacent to the rear end of one of the sidewalls of shell member 125. A narrow peripheral ledge 139 around the top of shell member 125 is provided to receive the cover plate 122. The interior of the cannister is divided into three chambers by two generally planar vertically spaced apart horizontally disposed partitions 152, 154. The upper partition 152 has a circular flue aperture with a downwardly extending collar 156 that fits snugly inside a vertically disposed cylindrical chimney 160. The flue aperture is located slightly off center from the lateral centerline of the partition towards the fume inlet aperture 138 end and also slightly off center from the longitudinal centerline thereof towards the sidewall containing the fume inlet aperture 138 (see FIG. 10). The lower partition 154 has a U-shaped aperture 164 divided into two equal segments by a narrow finger projecting to the center of the front wall of shell member 125 as shown in dashed lines in FIG. 10. A U-shaped vane member 170 has one leg affixed to the sidewall containing the fume inlet aperture 138. The vane member is located such that it shades the chimney 160 from the fumes entering the intermediate chamber and causes them to flow away from the center towards the outside of the chamber. The separating chamber is defined by the inside surfaces of the partitions, the vane member and the peripheral walls of the cannister. It has an oblong shape and is designed so that the incoming stream of oil laden gases is directed around the outside of the chamber in a generally circular flow pattern so as to produce a vortex region substantially centered with respect to the chimney and the flue aperture. In this embodiment 120 there is less shielding of the fume inlet and oil return apertures from the surrounding atmospheric environment than in the previously described embodiment 20 and thus it is suitable for less severe conditions than embodiment 20.

What is claimed is:

1. A device for separating oil from oil laden fumes in the crankcase ventilation system of an internal combustion engine, said device comprising an elongated sheet metal cannister with two opposite ends, a top wall, a peripheral wall, partition means and a U-shaped baffle positioned in the cannister and with respect to each other to in said cannister define a fume outlet chamber, a fume inlet chamber and an oblong separating chamber; an inlet opening in said cannister adjacent to one of said opposite ends and in flow communication with said inlet chamber for supplying oil laden fumes to said separating chamber; an outlet opening in said cannister adjacent to the other of said opposite ends and in flow communication with said fume outlet chamber for exhausting fumes from said fume outlet chamber, said baffle having its closed end adjacent to the inlet opening end of said cannister, one of the legs of said baffle being attached to a peripheral wall section of said cannister and the other leg spaced from an opposite peripheral wall section such that incoming oil laden fume is directed through said space into a first 180° volute section formed by an arcuate wall section of said oil separating chamber adjacent to the open end of said baffle and then into a second 180° volute section formed by the inside of the closed end of said baffle, said first volute section having a greater radius than said second volute section to thereby produce a vortex region adjacent to the center of said second volute section; a flue aperture in said partition means between said separating chamber and said fume outlet chamber above said vortex region in said separating chamber and an oil return hole in the bottom of said cannister.

2. An oil separating device according to claim 1 wherein said cannister comprises an inverted pan assembly having two partially overlapping pan members and a bottom cover plate extending under both pan members and said partition means includes a partition member comprising an overlapped integral panel portion of one of said pan assembly members.

3. An oil separating device according to claim 2 wherein the pan members of said pan assembly have interfitting means for maintaining the position of one pan member relative to the other pan member.

4. An oil separating device according to claim 2 wherein said baffle member and said pan member having said panel portion has interfitting means for maintaining the position of said panel portion in said pan member.

5. An oil separating device according claim 2 wherein said pan assembly has an arcuate bottom edge extending from one end to the other end and has a laterally extending peripheral flange attached to said bottom cover plate which is correspondingly curved.

6. An oil separating device according to claim 2 wherein said bottom plate is provided with scupper means extending upwardly into said separating chamber.

7. An oil separating device according to claim 6 wherein said scupper means comprises a pair of lanced slots beneath said flue aperture on opposite sides thereof with each slot opening facing in an upstream direction.

8. An oil separating device according to claim 2 wherein said fume outlet chamber is defined by the outside surface of the partially overlapped portion of one pan member, the inside surface of the partially overlapping pan member and a corresponding portion of said bottom cover plate.

9. An oil separating device according to claim 8 wherein an end of the partially overlapping pan member is located adjacent to said flue aperture and has a lateral flange in contact with said partially overlapped portion of said one pan member, and a step riser positioned and arranged for providing a shallow space between the overlapping portions of said pan member.

10. An oil separating device according to claim 2 wherein said oil separating chamber is defined by an inside surface portion of said overlapped pan member, the inside surface of said baffle member and a corresponding portion of said bottom plate.

11. An oil separating device according to claim 10 wherein said fume inlet chamber is defined by the outside surface of said baffle member, the remaining inside surface portion of said overlapped pan member and a corresponding portion of said bottom plate.

12. An oil separating device according to claim 2 wherein said bottom cover plate has an inlet opening at one end, a primary oil drain aperture in said oil separating chamber on the inside of the U-shaped baffle member adjacent to its closed end and a supplemental oil drain aperture adjacent to the opposite end of said bottom plate.

13. An oil separating device according to claim 12 wherein said bottom plate has a barrier plate affixed on the underside thereof and spaced therefrom.

14. An oil separating device according to claim 1 wherein said flue aperture is located approximately midway between the ends of said cannister and the height of said cannister at this midway location is less than the maximum height of said cannister.

* * * * *